(12) United States Patent
Asano

(10) Patent No.: US 8,605,200 B2
(45) Date of Patent: Dec. 10, 2013

(54) OPTICAL APPARATUS AND IMAGE-PICKUP SYSTEM

(75) Inventor: Takurou Asano, Kawachi-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 1040 days.

(21) Appl. No.: 11/874,628

(22) Filed: Oct. 18, 2007

(65) Prior Publication Data

US 2008/0158408 A1    Jul. 3, 2008

(30) Foreign Application Priority Data

Dec. 27, 2006    (JP) .................... 2006-353075

(51) Int. Cl.
*H04N 5/232* (2006.01)
*G03B 3/00* (2006.01)

(52) U.S. Cl.
USPC ............................................. 348/345; 396/79

(58) Field of Classification Search
USPC .............. 348/345–357, 208.14–208.16, 348/135–155; 396/79–83, 89–152; 250/201.2–201.7; 352/139, 140; 359/696, 698
See application file for complete search history.

(56) References Cited

U.S. PATENT DOCUMENTS

| | | | | |
|---|---|---|---|---|
| 5,812,193 A | * | 9/1998 | Tomitaka et al. | 348/369 |
| 5,862,417 A | * | 1/1999 | Ogasawara | 396/95 |
| 6,118,484 A | * | 9/2000 | Yokota et al. | 348/350 |
| 7,209,175 B1 | * | 4/2007 | Kurokawa et al. | 348/345 |
| 2002/0118965 A1 | * | 8/2002 | Ogg et al. | 396/79 |
| 2004/0036792 A1 | | 2/2004 | Moriya et al. | |
| 2005/0189419 A1 | | 9/2005 | Igarashi et al. | |
| 2006/0165402 A1 | | 7/2006 | Ishii | |
| 2006/0232701 A1 | * | 10/2006 | Ito et al. | 348/348 |

FOREIGN PATENT DOCUMENTS

| | | |
|---|---|---|
| JP | 04-178607 A | 6/1992 |
| JP | 06-337346 A | 12/1994 |
| JP | 10-170257 A | 6/1998 |
| JP | 2006-033023 A | 2/2006 |

OTHER PUBLICATIONS

All of the above reference were cited in a May 30, 2008 European Search Report (copy enclosed) of the counterpart European Patent Application 07119440.1

* cited by examiner

*Primary Examiner* — James M Hannett
*Assistant Examiner* — Akshay Trehan
(74) *Attorney, Agent, or Firm* — Cowan, Liebowitz & Latman, P.C.

(57) ABSTRACT

An optical apparatus includes a calculator that calculates a position of a focus lens for focusing on a subject, a setter that sets a permissible movable range of the focus lens, and a controller that sets, when the position of the focus lens calculated by the calculator is within the permissible movable range, the position to a target position to which the focus lens is moved. The setter redefines the permissible movable range based on position information showing one of the target position and a position of the focus lens after a movement of the focus lens toward the target position. The optical apparatus suppresses a focusing operation for a subject for which an operator does not intend to perform focusing.

16 Claims, 16 Drawing Sheets

OPTICAL APPARATUS AND IMAGE-PICKUP SYSTEM

BACKGROUND OF THE INVENTION

The present invention relates to an optical apparatus such as a so-called television lens or video lens. In particular, the present invention relates to an optical apparatus having an automatic focus (AF) function.

Moving-image pickup frequently incorporates a so-called full-time AF by which the position of a focus lens is controlled so as to always perform a focusing operation automatically (with a fixed cycle in a repeated manner).

However, the full-time AF may perform, depending on image-pickup conditions, the focusing operation for an object for which an operator does not intend to perform focusing. When an image of a subject for which the operator intends to perform focusing is picked up through a metal mesh for example, the focusing operation may be performed for the metal mesh or the background of the subject. Thus, an out of focus image may be picked up in the moving-image pickup because the focusing operation is performed for an unintended object for even a short time and thus defocusing from the subject for which the operator intends to perform focusing occurs.

In order to solve the problem described above, Japanese Patent Laid-Open No. 8-136799 has disclosed a technique in which an operator previously determines a permissible movable range within which a focus lens can be moved and the focus lens is moved only within this range to perform focusing.

However, in the technique disclosed in Japanese Patent Laid-Open No. 8-136799, when an in-focus position of the focus lens is detected for an object for which focusing is performed outside of the permissible movable range within which the focus lens can be moved, the focus lens is driven to an end of the permissible movable range. Specifically, an influence by the object for which the focusing operation should not be performed causes the drive of the focus lens which is otherwise not required.

Furthermore, this technique fixes the permissible movable range of the focus lens. Thus, in order to continuously maintain an in-focus state for a significantly moving subject, this technique requires a wide permissible movable range of the focus lens. In this case, when there is a plurality of objects that can be focused on at positions of the focus lens within the permissible movable range, the focusing operation may be performed for an object for which the operator does not intend to perform focusing.

For example, when an object that is not a focusing target passes before a subject as a focusing target, a hunting operation may be caused in which the focusing operation is performed for the object that is not the focusing target and the focusing operation is subsequently performed for the subject that is the focusing target.

SUMMARY OF THE INVENTION

The present invention provides an optical apparatus that can suppress a focusing operation for an object for which an operator does not intend to perform focusing.

According to an aspect, the present invention provides an optical apparatus including a moveable focus lens, a calculator that calculates the position of the focus lens for focusing on a subject, a setter that sets a permissible movable range of the focus lens, and a controller configured to control movement of the focus lens, that uses, when the position of the focus lens calculated by the calculator is within the permissible movable range, the calculated position as a target position to which the focus lens is moved. The setter redefines the permissible movable range based on position information showing one of the target position and the position of the focus lens after a movement of the focus lens toward the target position.

According to an aspect, the present invention provides an image-pickup system including the above optical apparatus and an image-pickup apparatus mountable to the optical apparatus.

DESCRIPTION OF THE EMBODIMENTS

Exemplary embodiments of the present invention will now be described with reference to the accompanying drawings.

Embodiment 1

Figure 1:
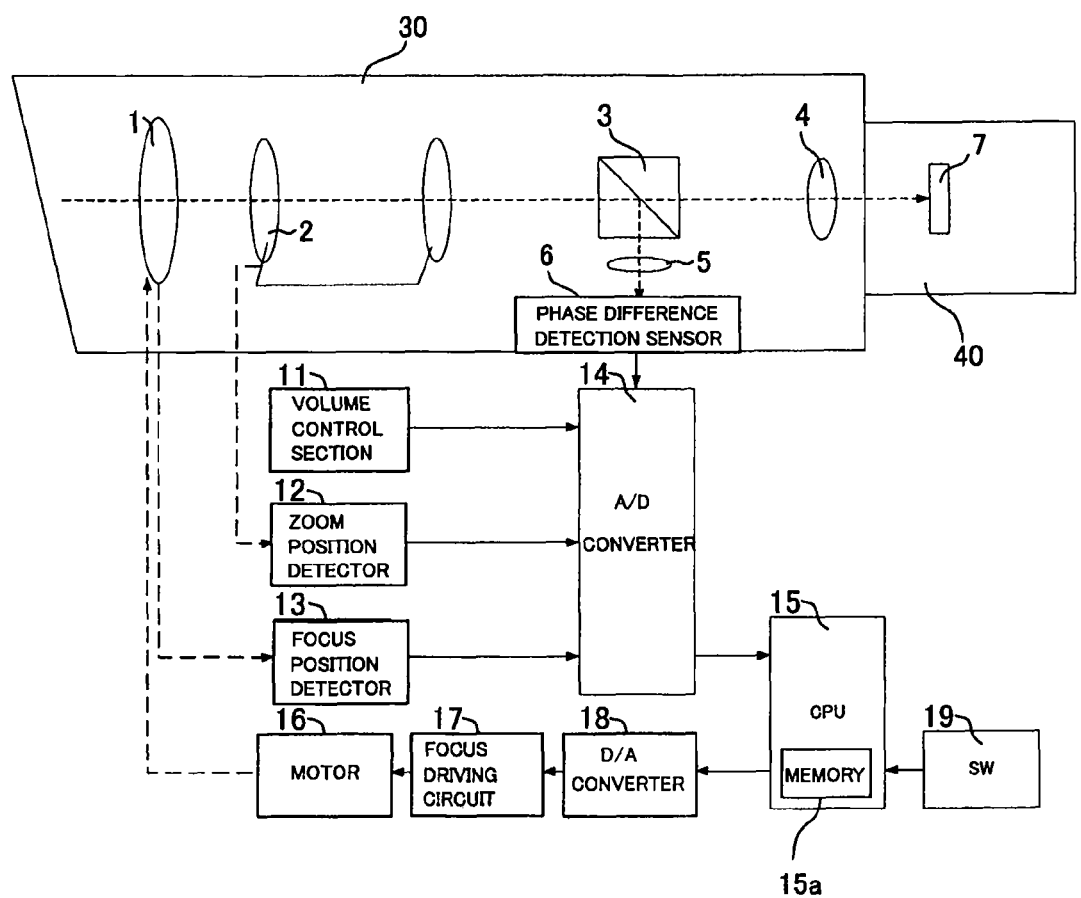
FIG. 1 is a block diagram showing the configuration of a zoom lens apparatus that is Embodiment 1 and Embodiment 2 of the present invention.

FIG. 1 shows the configuration of a zoom lens apparatus as an optical apparatus that is Embodiment 1 of the present invention.

Reference numeral 30 denotes a zoom lens apparatus. Reference numeral 40 denotes a camera (an image-pickup apparatus such as a television camera or a video camera) that is mountable to the zoom lens apparatus 30. The zoom lens apparatus 30 and the camera 40 constitute an image-pickup system.

In the zoom lens apparatus 30, reference numeral 1 denotes a focus lens that is moved in an optical axis direction to change the position of the image-forming plane of the zoom lens apparatus 30 (i.e., to perform focusing). Reference numeral 2 denotes a magnification-varying lens that is moved in the optical axis direction to change the focal length of the zoom lens apparatus 30. Light passing through these lenses 1 and 2 is divided into two light fluxes by a light-dividing prism 3.

One of the light fluxes which is transmitted through the light-dividing prism 3 passes through a relay lens 4 to enter an image-pickup element 7 (e.g., CCD sensor, CMOS sensor) provided in the camera 40. The other light flux reflected by the light-dividing prism 3 is divided into two light fluxes by a phase difference detection lens 5 and the resultant two light fluxes enter a phase difference detection sensor 6. The phase difference detection lens 5 and the phase difference detection sensor 6 constitute a focus detector using a phase difference detection method.

The phase difference detection sensor 6 has a pair of photoelectrical conversion element arrays (hereinafter referred to as line sensors) for photoelectrically converting a pair of images (two images) formed by the two light fluxes divided by the phase difference detection lens 5. Each of the line sensors outputs an analog signal depending on the luminance of the above image. This analog signal is converted to a digital signal by an A/D converter 14 and the resultant digital signal is subsequently input to a CPU 15.

Reference numeral 11 denotes a second operating member for variably changing a permissible focusing range as a permissible movable range of the focus lens 1, the second operating member 11 being operated by an operator (e.g., a camera operator or a remote-controlling operator). The second operating member 11 outputs an analog signal in accordance with its operation amount. This analog signal is converted by the A/D converter 14 to a digital signal and the resultant digital signal is input to the CPU 15.

Reference numeral 12 denotes a zoom position detector that outputs a signal (voltage) in accordance with the position of the magnification-varying lens 2. The signal from the zoom position detector 12 is converted to a digital signal by the A/D converter 14 and the resultant digital signal is input to the CPU 15.

Reference numeral 13 denotes a focus position detector that outputs a signal (voltage) in accordance with the position of the focus lens 1. The signal from the focus position detector 13 is converted to a digital signal by the A/D converter 14 and the resultant digital signal is input to the CPU 15.

Reference numeral 19 denotes a switch (first operating member) for determining whether the limitation on the movable range of the focus lens 1 by the permissible focusing range is valid or invalid. This switch 19 is operated by the operator. A signal from the switch 19 is input to the CPU 15.

The CPU 15 serves as a calculator, a setter, and a controller. The CPU 15 performs a focus control processing in accordance with the above respective input signals to generate a control signal for the focus lens 1 based on a computer program. This control signal is converted by the D/A converter 18 to an analog signal and the resultant analog signal is input to a focus driving circuit 17. The focus driving circuit 17 drives a motor 16 in accordance with the control signal to move the focus lens 1. The operation for moving the focus lens 1 as described above is called a focusing operation.

Figure 2A:
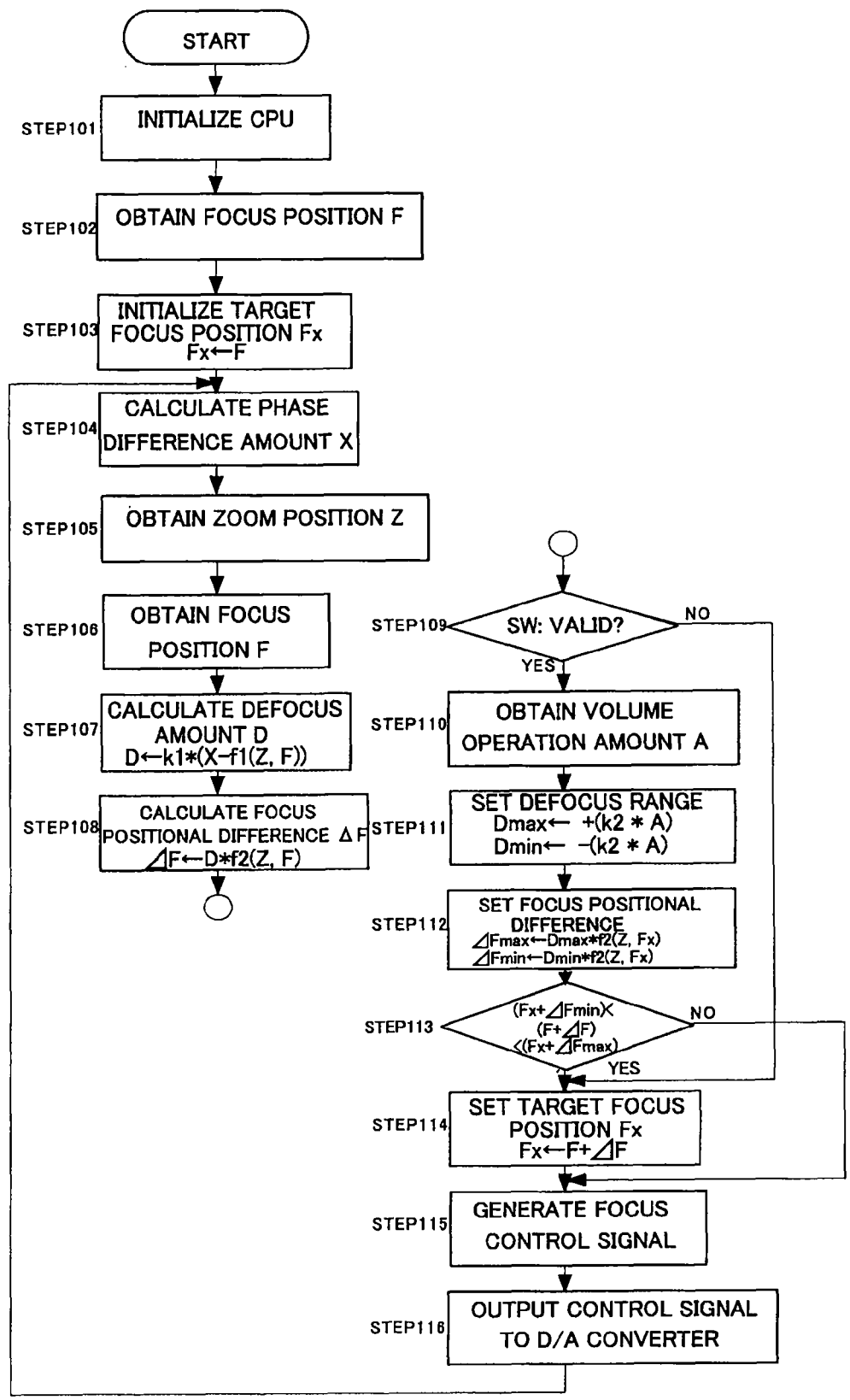
FIG. 2A is a flowchart showing a focus control processing in Embodiment 1.

FIG. 2A is a flowchart showing the focus control processing executed by the CPU 15 based on the computer program. In the following description, the positions of the focus lens 1 and the magnification-varying lens 2 will be called a focus position and a zoom position, respectively.

When the power to the zoom lens apparatus 30 is turned on, the process proceeds to STEP 101 where the CPU 15 initializes a register, a memory 15a and the like provided in the CPU 15.

In STEP 102, the CPU 15 obtains a current focus position F detected by the focus position detector 13. In STEP 103, the CPU 15 initializes a target focus position Fx that is a target position to which the focus lens 1 is moved and stored in the memory 15a to a current focus position F.

Next, in STEP 104, the CPU 15 calculates a phase difference amount X of the two images formed on the line sensors based on the signal from the phase difference detection sensor 6. The processing for calculating the phase difference amount X is performed in the manner as described below.

Figure 3:
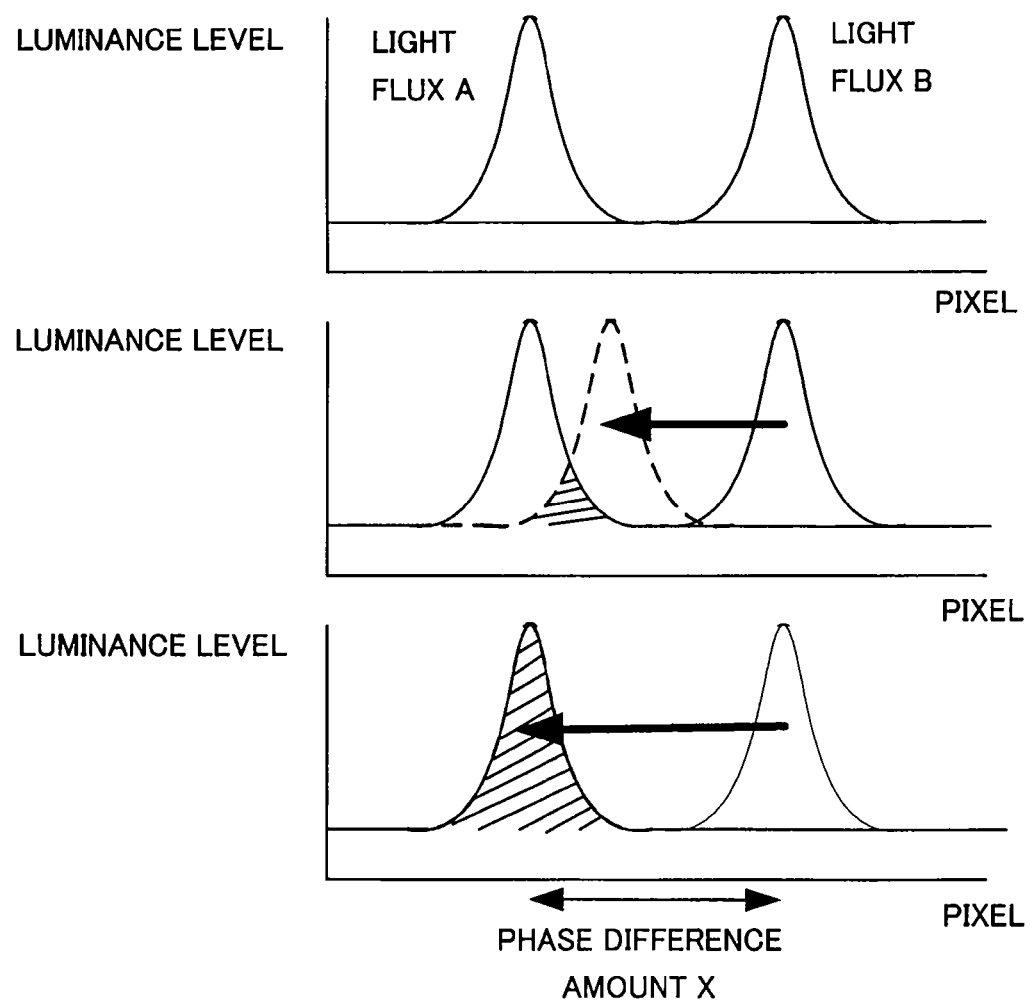
FIG. 3 shows a phase difference amount.

First, the CPU 15 obtains the signals corresponding to the two images from the phase difference detection sensor 6 to obtain luminance level characteristics of the two images (light fluxes A and B) as shown in FIG. 3. Next, the CPU 15 performs a pixel shift calculation on the luminance level characteristic of one image by software processing to determine a shift amount at which the luminance level characteristics of the two images overlap at the maximum (which is shown by the shaded area in FIG. 3) as the phase difference amount X.

Next, in STEP 105 and STEP 106, the CPU 15 obtains the zoom position Z and the focus position F detected by the zoom position detector 12 and the focus position detector 13.

In STEP 107, the CPU 15 calculates a defocus amount D based on the phase difference amount X, the zoom position Z, and the focus position F obtained in STEP 104 to STEP 106. The defocus amount D represents a distance (optical positional difference) from the light-receiving surface of the image-pickup element 7 to the image-forming plane, which is not a mechanical moving distance of the focus lens 1. The calculation of the defocus amount D is performed by using the following expression:

$$D = k1 \times (X - f1(Z,F))$$

In this expression, k1 represents a fixed coefficient for converting the phase difference amount to the defocus amount, and f1(Z,F) represents a function showing an offset amount of the phase difference amount determined depending on the zoom position Z and the focus position F and is stored in the CPU 15 as table data. These k1 and f1 are determined by the optical configuration of the focus lens 1, the magnification-varying lens 2, and the phase difference detection lens 5.

In STEP 108, the CPU 15 converts the defocus amount D to a focus positional difference corresponding to the mechanical driving amount of the focus lens 1. The focus positional difference ΔF is calculated by using the following expression:

$$\Delta F = D \times f2(Z,F)$$

In the expression, f2(Z,F) represents a function determined by the zoom position Z and the focus position F and is stored in the CPU 15 as table data, as with f1(Z,F).

In STEP 109, the CPU 15 determines, based on the signal from the switch 19, whether the limitation on the movement of the focus lens 1 based on the permissible focusing range is valid or invalid. This limitation is valid when the switch 19 is on, and then the process proceeds to STEP 110. When the limitation is determined as invalid, the process jumps to STEP 114. Thus, the focusing operation for an arbitrary subject can be performed by turning off the switch 19 to invalidate the limitation on the movement of the focus lens 1 based on the permissible focusing range.

In STEP 110, the CPU 15 obtains the operation amount A of the second operating member 11. In STEP 111, the CPU 15 calculates the defocus range from Dmin to Dmax corresponding to the operation amount A of the second operating member 11 by using the following expressions including the operation amount A and a coefficient k2 for converting the operation amount A to the defocus amount:

$$D\max = k2 \times A$$

$$D\min = -k2 \times A$$

Next, in STEP 112, the CPU 15 converts each of Dmax and Dmin calculated in STEP 111 to a focus positional difference for the current target focus position Fx. The current target focus position Fx means the target focus position Fx until the CPU 15 updates it in STEP 114 (which will be described later). The conversion to the focus positional difference is performed by the following expressions including the function f2 (Z,F) used in STEP 108:

$$\Delta F\max = D\max \times f2(Z, Fx)$$

$$\Delta F\min = D\min \times f2(Z, Fx)$$

From these ΔFmax and ΔFmin, the permissible focusing range on the basis of the current target focus position Fx is a range from (Fx+ΔFmin) to (Fx+ΔFmax).

In Embodiment 1, the permissible focusing range is set so as to provide the same defocus amount for a near range and a far range to the current target focus position Fx. Alternatively, the following expressions also may be used to set the permissible focusing range so as to provide the same positional difference of the focus lens 1 for the near range and the far range to the current target focus position Fx.

$$\Delta f\max = k2' \times A$$

$$\Delta f\min = -k2' \times A$$

In the above expressions, k2' represents a coefficient for converting the operation amount A of the second operating member 11 to the positional difference of the focus lens 1.

A detected in-focus position that is calculated based on the signal from the phase difference detection sensor 6 is obtained by adding the focus positional difference ΔF corresponding to the defocus amount D to the current focus position F. Specifically, the detected in-focus position is expressed as (F+ΔF).

Then, the CPU 15 in STEP 113 determines whether or not the detected in-focus position (F+ΔF) is within the permissible focusing range from (Fx+ΔFmin) to (Fx+ΔFmax). Although the flowchart shows whether or not the detected in-focus position is within the permissible focusing range by (Fx+ΔFmin)<(F+ΔF)<(Fx+ΔFmax), in similar determinations in this embodiment and other embodiments described later, the detected in-focus position within the permissible focusing range includes the detected in-focus position corresponding to each end of the permissible focusing range.

When the detected in-focus position (F+ΔF) is within the permissible focusing range, the process proceeds to STEP 114 where the CPU 15 updates the target focus position Fx stored in the memory 15a to the detected in-focus position (F+ΔF). When the CPU 15 determines that the detected in-focus position (F+ΔF) is not within the permissible focusing range in STEP 113, the CPU 15 invalidates the detected in-focus position (F+ΔF) without updating (that is, with maintaining) the target focus position Fx stored in the memory 15a. Then, the process proceeds to STEP 115.

In STEP 115, the CPU 15 generates the control signal for driving the focus lens 1 to the set target focus position Fx. In STEP 116, the CPU 15 outputs the control signal to the D/A converter 18.

Then, the process returns to STEP 104 where the CPU 15 repeats the same processing. In STEP 112 in and after the second routine, the CPU 15 redefines (updates) the permissible focusing range from (Fx+ΔFmin) to (Fx+ΔFmax) by using the target focus position Fx updated or maintained in STEP 114 in the previous routine. Thus, the permissible focusing range is changed in accordance with (or to follow) the change in the target focus position Fx.

Figure 4A:
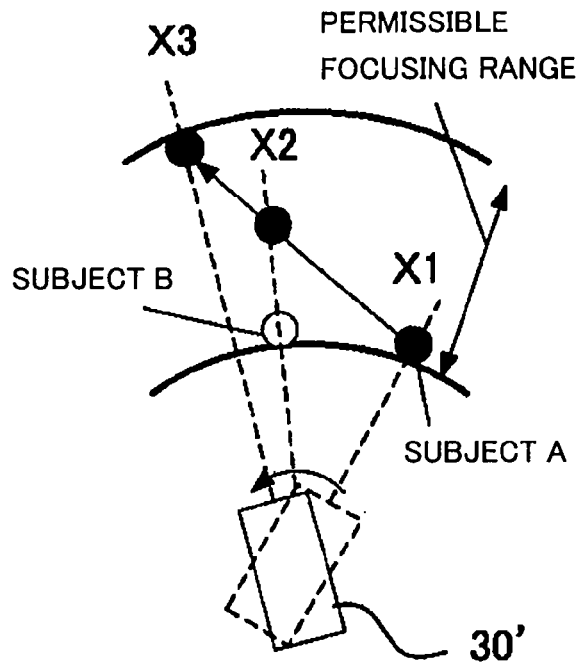
FIG. 4A shows a focusing operation when an absolute permissible focusing range is set in Embodiment 1.
Figure 4B:
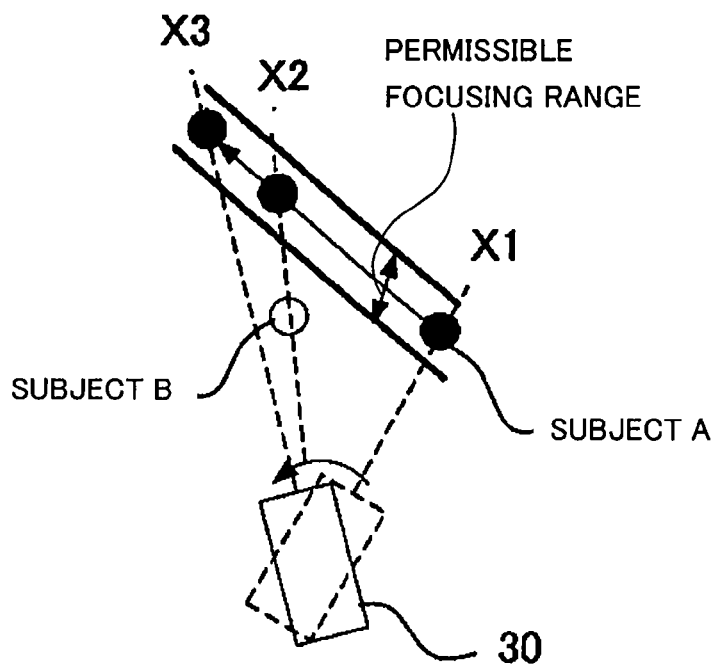
FIG. 4B shows a focusing operation when a relative permissible focusing range is set in Embodiment 1.

FIGS. 4A and 4B show the positions of the zoom lens apparatus and subjects A and B when seen from above. The subject A is a focusing target for which the operator intends to perform focusing. The subject A moves from a position X1 to positions X2 and X3. The subject B is an object that is not a focusing target.

FIG. 4A shows a case where the permissible focusing range is an absolute range (hereinafter referred to as an absolute permissible focusing range). The absolute range is a fixed range specified based on the distance from the zoom lens apparatus 30'. FIG. 4B shows a case where the permissible focusing range is a relative range (hereinafter referred to as a relative permissible focusing range) from a current target focus position as in this embodiment.

When the absolute permissible focusing range is set as shown in FIG. 4A, a case where the moving range of the subject A (distance range in a direction in which the subject A approaches the zoom lens apparatus 30') is wide must be assumed, which makes it necessary to expand the permissible focusing range. As a result, when the zoom lens apparatus 30' is turned from the direction X1 to the direction X2 in order to follow the subject A as the focusing target, the subject B that is not the focusing target is located in front of the subject A. When the subject B is within the permissible focusing range, the focusing operation may be performed for the subject B.

In contrast, when the relative permissible focusing range is set as shown in FIG. 4B, the permissible focusing range is always (for every routine cycle in the flowchart of FIG. 2A) redefined (or updated). Thus, regardless of the moving range of the subject A, the permissible focusing range can be set to be narrow (narrower than the absolute permissible focusing range). Thus, even when the subject B that is not the focusing target is located in front of the subject A that is the focusing target, the focusing operation for subject B is prevented from being performed. In other words, the probability of the focusing operation being performed for the subject B, for which the operator does not intend to perform focusing, can be reduced.

Figure 2B:
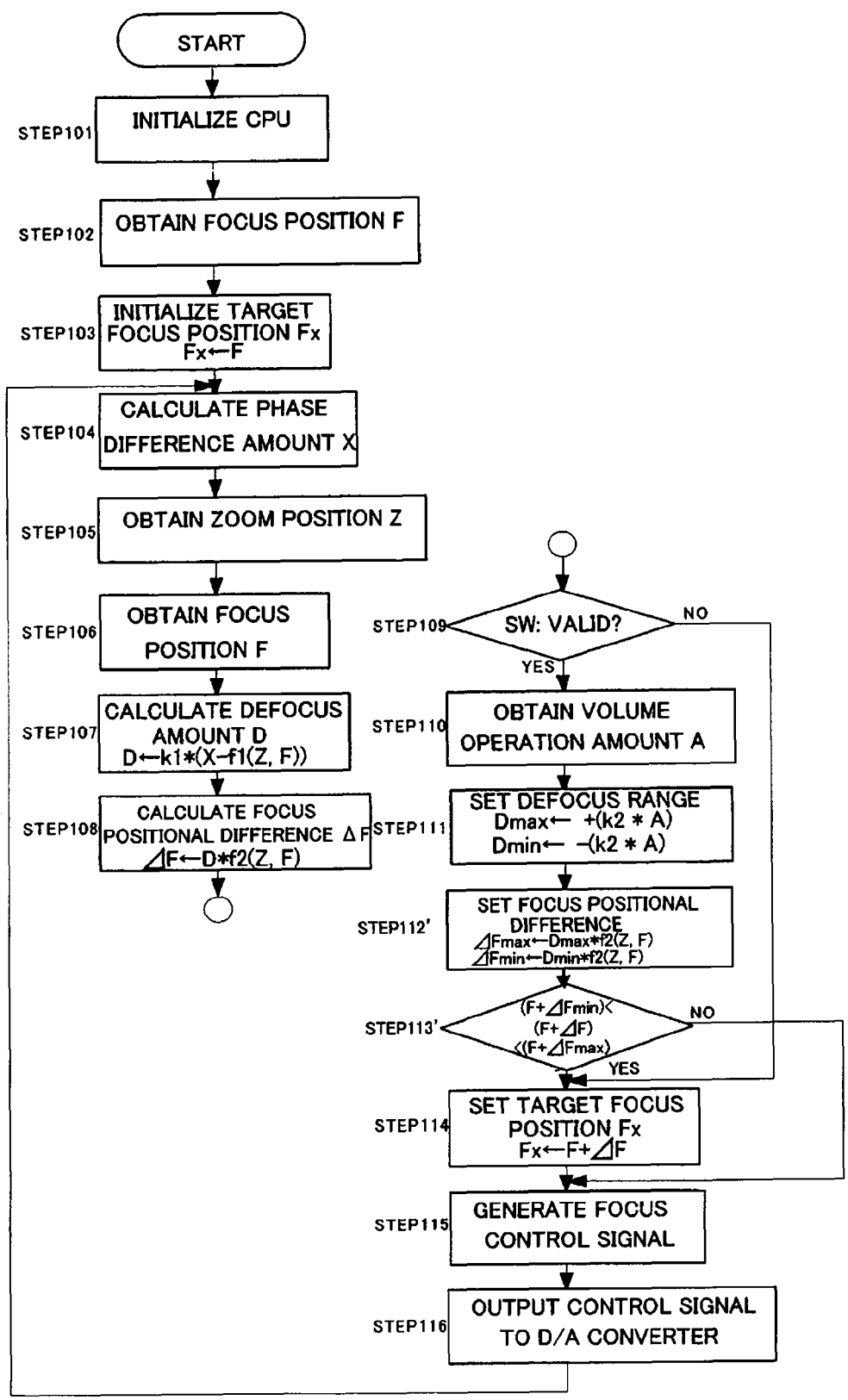
FIG. 2B is a flowchart showing a modified example of the focus control processing in Embodiment 1.

In FIG. 2A, the case was described where the permissible focusing range was redefined based on the target focus position Fx. However, the permissible focusing range may be redefined based on the position of the focus lens 1 detected by the focus position detector 13 after the focus lens 1 is moved toward the target focus position Fx. In other words, the permissible focusing range also may be redefined based on the focus position F detected in STEP 106 in the current routine after the focusing operation in the previous routine. FIG. 2B shows a flowchart for this case.

In FIG. 2B, the processing in STEP 101 to STEP 111 are the same as those in STEP 101 to STEP 111 in FIG. 2A. In STEP 112, the following expressions are used to calculate the focus positional differences:

$$\Delta f\max = D\max \times f2(Z,F)$$

$$\Delta f\min = D\min \times f2(Z,F)$$

From these ΔFmax and ΔFmin, the permissible focusing range from (F+ΔFmin) to (F+ΔFmax) is set on the basis of the focus position F detected in STEP 106.

Then, the CPU 15 in STEP 113' determines whether or not the detected in-focus position (F+ΔF) of the focus lens 1 is within the permissible focusing range from (F+ΔFmin) to (F+ΔFmax). When the detected in-focus position (F+ΔF) is within the permissible focusing range, the process proceeds to STEP 114. When the detected in-focus position (F+ΔF) is not within the permissible focusing range, the process proceeds to STEP 115. The processings in STEP 114 to STEP 116 are the same as those in FIG. 2A.

In the other embodiments described later, the permissible focusing range may also be redefined based on the position of the focus lens 1 detected by the focus position detector 13 after the focus lens 1 is moved toward the target focus position Fx as described above.

Embodiment 2

Figure 5:
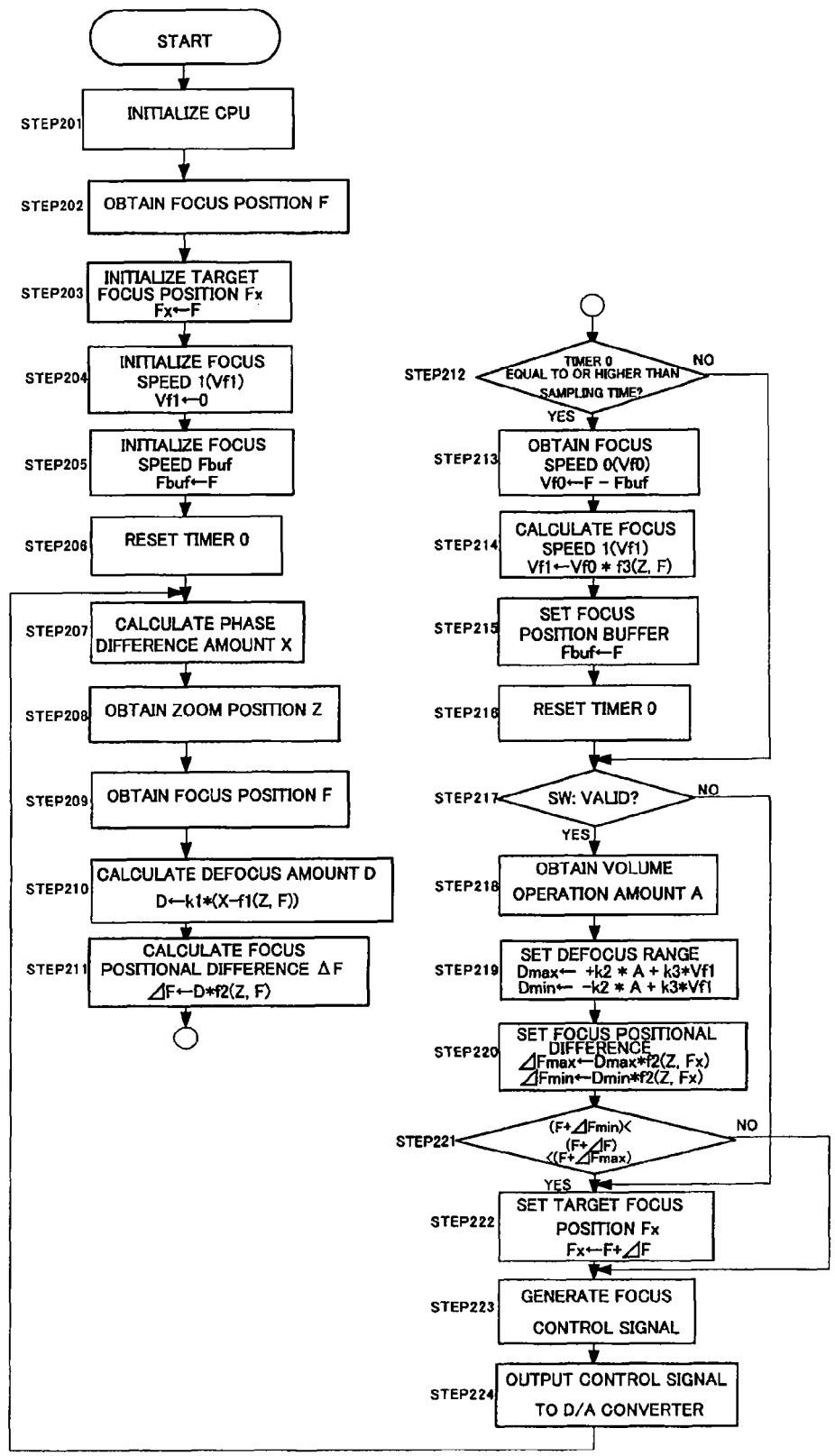
FIG. 5 is a flowchart showing the focus control processing in Embodiment 2.

With reference to FIG. 5, focus control processing by a zoom lens apparatus that is Embodiment 2 of the present invention will now be described. The zoom lens apparatus of this embodiment has the same configuration as that of Embodiment 1 (FIG. 1).

When power to the zoom lens apparatus 30 is turned on, the process proceeds to STEP 201 where the CPU 15 initializes the register, the memory 15a and the like in the CPU 15.

In STEP 202, the CPU 15 obtains the current focus position F detected by the focus position detector 13. In STEP 203, the CPU 15 initializes the target focus position Fx that is the target position to which the focus lens 1 is moved and stored in the memory 15a to the current focus position F.

Next, the CPU 15 in STEP 204 initializes a focus speed 1(Vf1) stored in the memory 15a to 0. In STEP 205, the CPU 15 sets a focus position buffer Fbuf for detecting a focus speed to the current focus position F.

Next, in STEP 206, the CPU 15 resets (or restarts) a timer 0. This timer 0 is used to count a sampling time for detecting the focus speed.

When the above initialization processing is completed, the process proceeds to STEP 207 where the CPU 15 performs STEP 207 to STEP 211 similar to those in STEP 104 to STEP 108 of Embodiment 1 to generate the focus positional difference ΔF corresponding to the defocus amount D.

Next, in STEP 212, the CPU 15 determines whether or not the sampling time (a threshold value previously set for the timer 0) has elapsed. When the sampling time has elapsed, the process proceeds to STEP 213. When the sampling time has not elapsed, the process jumps to STEP 217.

In STEP 213, the CPU 15 calculates a mechanical focus positional difference between the focus position F obtained in STEP 209 in the previous routine and the current focus position F to define the calculated mechanical focus positional difference as a focus speed 0 (Vf0). In STEP 214, the CPU 15 defines a moving speed of the image-forming plane corresponding to this focus speed 0 (Vf0) as the focus speed 1 (Vf1) to calculate the focus speed 1 (Vf1) by the following expression:

$$Vf1 = Vf0 \times f3(Z,F)$$

In the above expression, f3(Z,F) represents a coefficient determined by the zoom position Z and the focus position F, which is stored in the CPU 15 as table data. In this manner, the focus position detector 13 and the CPU 15 constitute a moving-subject speed detector.

Next, in STEP 214 and STEP 215, the CPU 15 updates the focus position buffer Fbuf and resets (or restarts) the timer 0 in order to calculate the next focus speed.

Then, in STEP 217, the CPU 15 determines, based on a signal from the switch 19, whether the limitation on the movement of the focus lens 1 by the permissible focusing range is valid or invalid. When the limitation is valid, the process proceeds to STEP 218. When the limitation is invalid, the process jumps to STEP 222.

In STEP 218, the CPU 15 obtains the operation amount A of the second operating member 11. Then, in STEP 219, the CPU 15 calculates the defocus range from Dmin to Dmax corresponding to the operation amount A of the volume 11 by using the following expressions including the operation amount A, the coefficient k2 for converting the operation amount A to the defocus amount and the focus speed 1 (Vf1):

$$D\max = k2 \times A + k3 \times Vf1$$

$$D\min = -k2 \times A + k3 \times Vf1$$

In the above expressions, (k3×Vf1) represents a correction amount depending on the speed for a defocus range (i.e., for the permissible focusing range) and k3 represents a positive coefficient (fixed value) for generating the correction amount depending on the speed based on the focus speed Vf1.

In STEP 221 to STEP 224, the CPU 15 performs the same processing as in STEP 113 to STEP 116 in Embodiment 1. Then, the process returns to STEP 207 to repeat the processing. In STEP 221 in and after the second routine, the CPU 15 redefines (or updates) the permissible focusing range from (Fx+ΔFmin) to (Fx+ΔFmax) by using the target focus position Fx updated or maintained in STEP 222 in the previous routine. Thus, the permissible focusing range is changed in accordance with (or to follow) the change in the target focus position Fx. In particular, the permissible focusing range is changed depending on the subject moving speed in this embodiment.

Figure 6A:
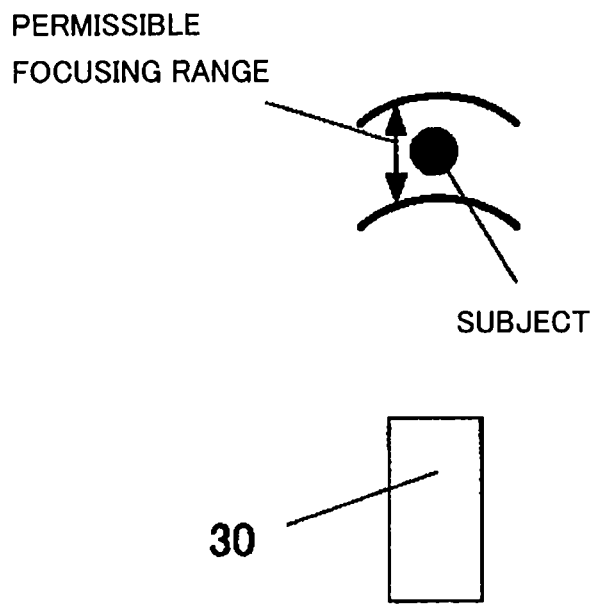
FIG. 6A shows a permissible focusing range when a subject remains stationary in Embodiment 2.
Figure 6B:
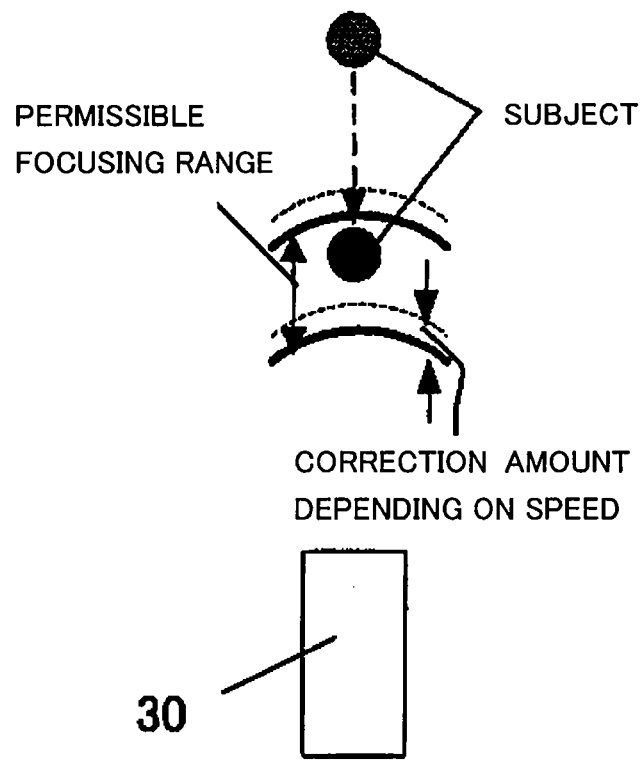
FIG. 6B shows a permissible focusing range when a subject approaches the zoom lens apparatus in Embodiment 2.
Figure 6C:
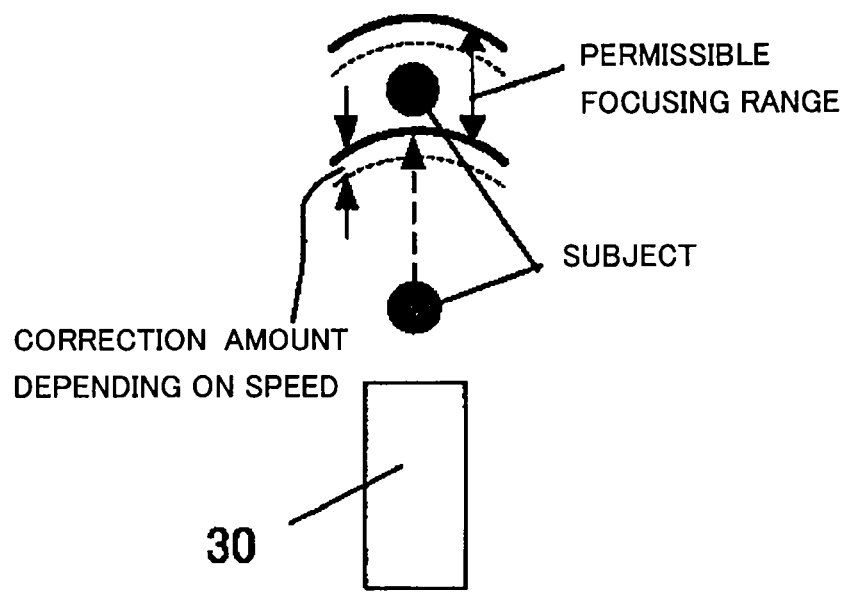
FIG. 6C shows a permissible focusing range when a subject moves away from the zoom lens apparatus in Embodiment 2.

FIGS. 6A to 6C show the zoom lens apparatus 30 of Embodiment 2 and the movement of the subject (as the focusing target) for which the operator intends to perform focusing when seen from the above.

FIG. 6A shows the permissible focusing range set so as to cover a stationary subject. As shown in FIG. 6B, when the subject approaches the zoom lens apparatus 30 in the optical axis direction of the image pickup optical system, the permissible focusing range is changed to the near side by the above correction amount depending on the speed from the original permissible focusing range shown by the dotted line. As shown in FIG. 6C, when the subject moves away from the zoom lens apparatus 30, the permissible focusing range is changed to the far side by the correction amount depending on the speed from the original permissible focusing range shown by the dotted line. Thus, the permissible focusing range is changed to follow even a subject moving with a high speed, thus reducing the possibility that the permissible focusing range fails to cover the subject.

Specifically, a narrow permissible focusing range can be set for even a moving subject. This can suppress the focusing operation from being performed for another object that is not the focusing target while continuously focusing on the moving subject.

Embodiment 3

Figure 7:
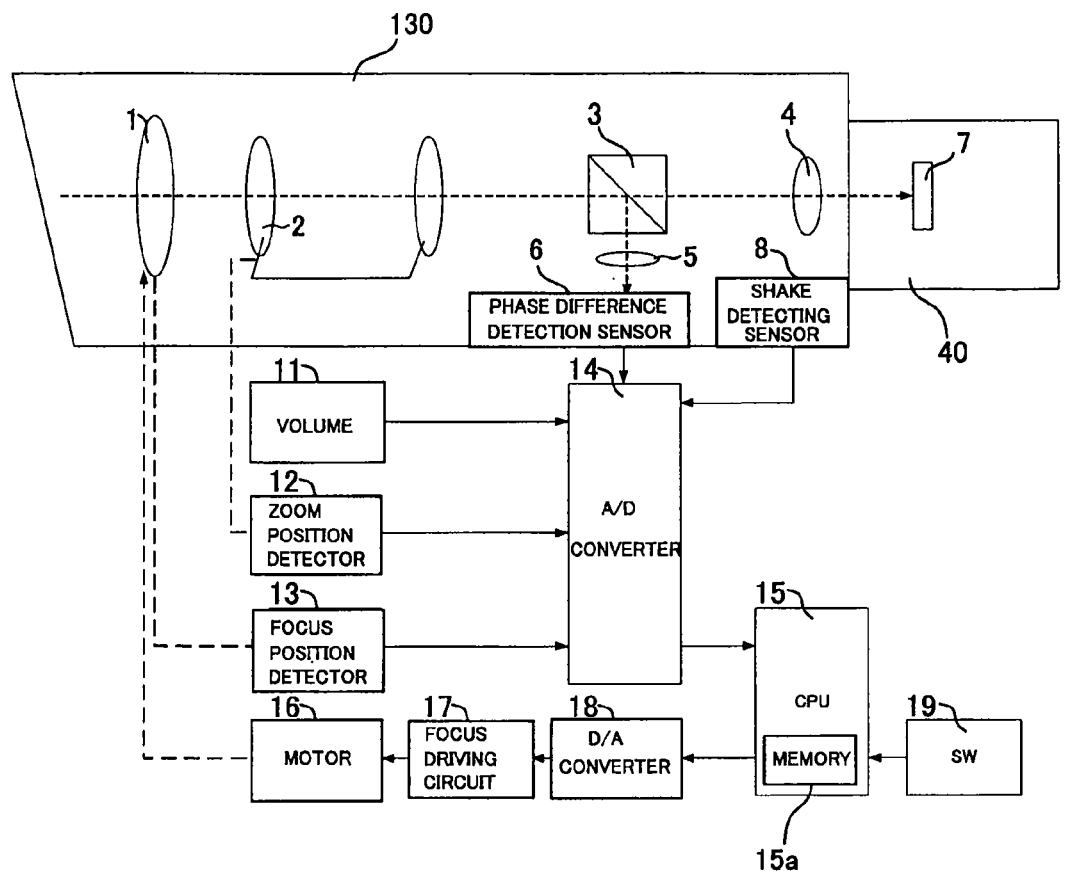
FIG. 7 is a block diagram showing the configuration of a zoom lens apparatus that is Embodiment 3 of the present invention.

FIG. 7 shows the configuration of a zoom lens apparatus 130 that is Embodiment 3 of the present invention. In FIG. 7, the same components as those shown in FIG. 1 are denoted with the same reference numerals.

Reference numeral 8 denotes a shake detecting sensor used for image stabilization processing for compensating image shake due to a hand jiggling for example. The shake detecting sensor 8 outputs an analog signal showing an angular velocity of the zoom lens apparatus 130. In this embodiment, the shake detecting sensor (orientation detector) 8 is used to detect the change of orientation of the zoom lens apparatus 130 in a panning (horizontally moving or rotating) direction and a tilting (vertically moving or rotating) direction. The angular velocity signal from the shake detecting sensor 8 is converted by the A/D converter 14 to a digital signal and the digital signal is input to the CPU 15.

Figure 8:
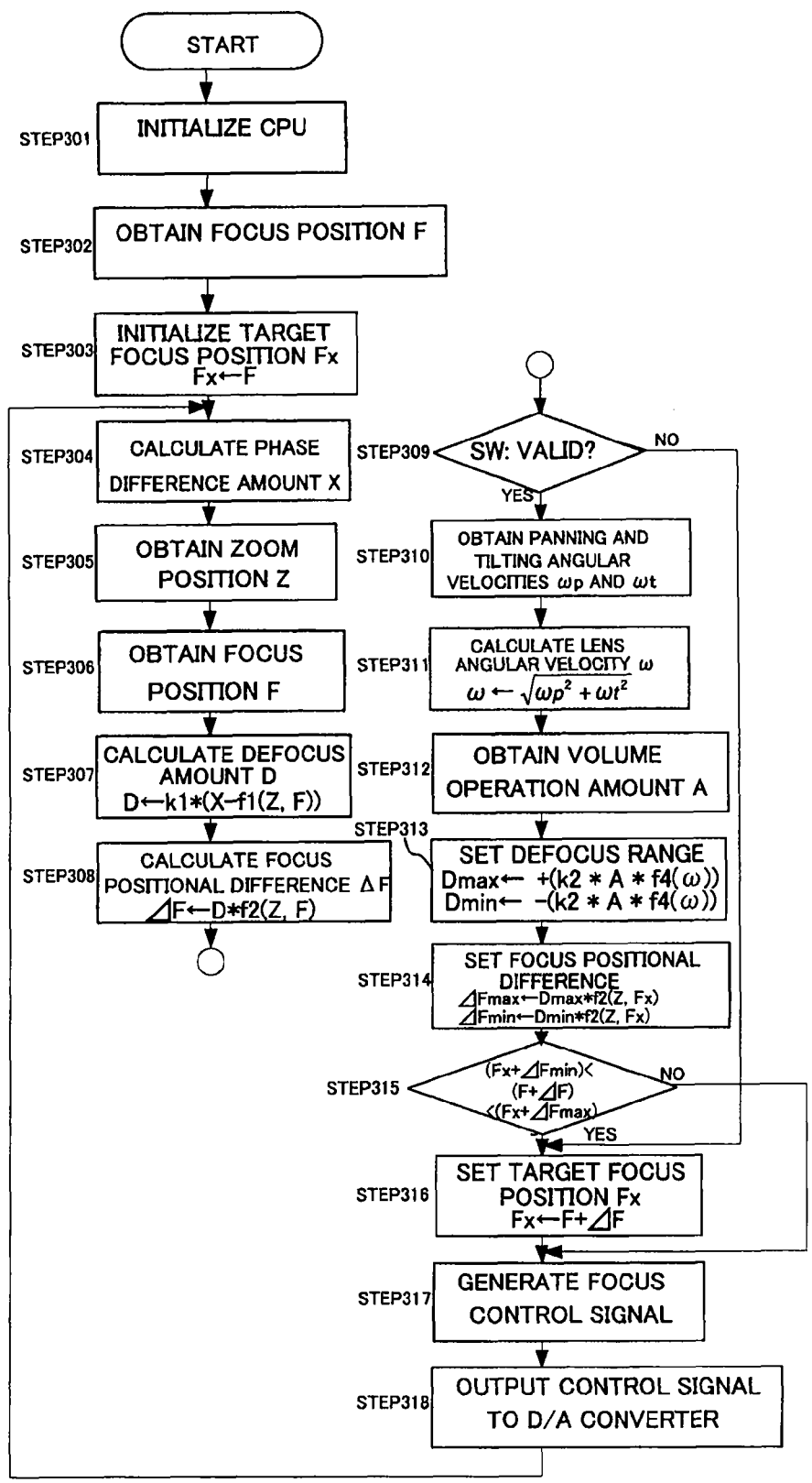
FIG. 8 is a flowchart showing a focus control processing in Embodiment 3.

FIG. 8 is a flowchart showing the focus control processing performed by the CPU 15 of the zoom lens apparatus 130 in this embodiment.

When the power to the zoom lens apparatus 130 is turned on, the process proceeds to STEP 301 where the CPU 15 initializes the register, the memory 15a and the like in the CPU 15.

In STEP 302, the CPU 15 obtains the current focus position F detected by the focus position detector 13. In STEP 303, the CPU 15 initializes the target focus position Fx that is the target position to which the focus lens 1 is moved and stored in the memory 15a to the current focus position F.

Next, in STEP 304 to STEP 309, the CPU 15 performs the same processing as in STEP 104 to STEP 109 in Embodiment 1.

When the CPU 15 determines, based on the signal from the switch 19, that the limitation on the movement of the focus lens 1 by the permissible focusing range is invalid in STEP 309, the process jumps to STEP 316. When the CPU 15 determines that the limitation on the movement of the focus lens 1 by the permissible focusing range is valid in STEP 309, the process proceeds to STEP 310 where the CPU 15 obtains the angular velocity $\Omega p$ in the panning direction and the angular velocity $\Omega t$ in the tilting direction which are detected by the shake detecting sensor 8.

Next, in STEP 311, the CPU 15 uses the following expression to calculate a lens angular velocity $\Omega$ from those angular velocities $\Omega p$ and $\Omega t$.

Next, in STEP 312, the CPU 15 obtains the operation amount A of the second operating member 11. In STEP 313, the CPU 15 calculates the defocus range from Dmin to Dmax corresponding to the operation amount A of the second operating member 11 by using the following expressions including the operation amount A and the lens angular velocity $\Omega$ calculated in STEP 311:

$$D\max = k2 \times A \times f4(\omega)$$

$$D\min = -k2 \times A \times f4(\omega)$$

Figure 9:
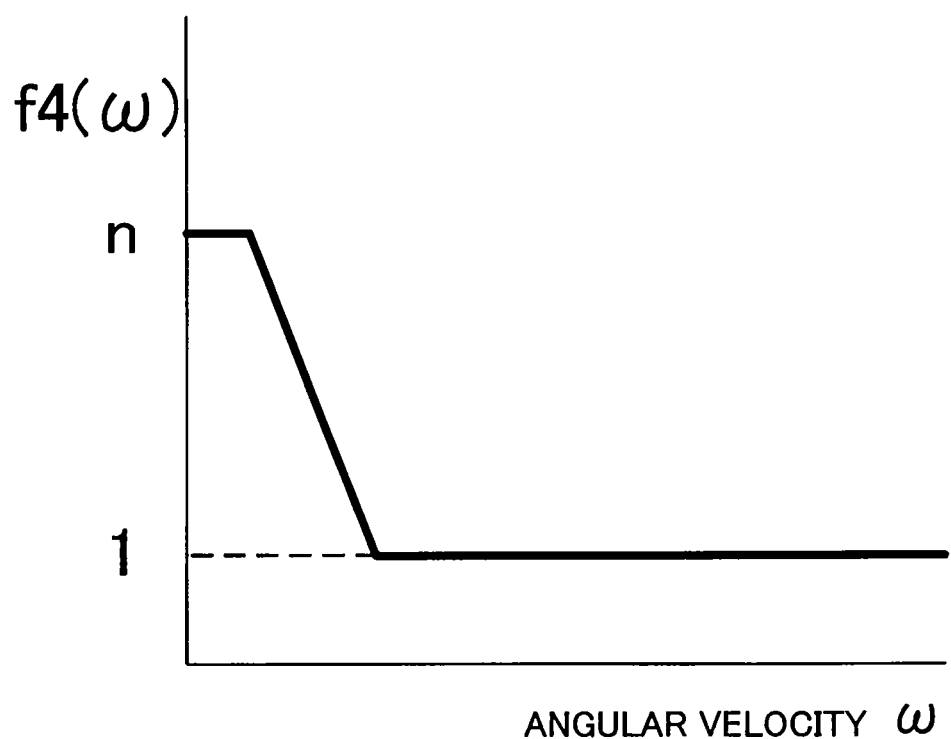
FIG. 9 shows the relationship between a lens angular velocity $\omega$ and a function $f4(\omega)$ in Embodiment 3.

In the above expressions, f4 ($\omega$) represents a function for determining the defocus range (i.e., the permissible focusing range) based on the lens angular velocity $\omega$, an example of which is shown in FIG. 9.

In FIG. 9, when the lens angular velocity $\omega$ is sufficiently high, that is, when the zoom lens apparatus 130 is subjected to a panning or tilting operation (hereinafter collectively called a panning operation), f4($\omega$) is set to 1. On the other hand, when the lens angular velocity $\omega$ is close to 0, that is, when the panning operation is not performed and only a lens shake due to a hand jiggling for example is caused, f4($\omega$) is set to n that is larger than 1. Specifically, when the panning operation is performed, the width of the defocus range (i.e., the width of the permissible focusing range) is reduced as compared to the case where the panning operation is not performed.

In STEP 314 to STEP 318, the CPU 15 performs the same processing as in STEP 112 to STEP 116 of Embodiment 1, and then the process returns to STEP 304 again. In STEP 315 in and after the second routine, the CPU 15 redefines (or updates) the permissible focusing range from (Fx+$\Delta$Fmin) to (Fx+$\Delta$Fmax) by using the target focus position Fx updated or maintained in STEP 316 in the previous routine. Thus, the permissible focusing range is changed in accordance with (or to follow) the change in the target focus position Fx. In particular, in this embodiment, the permissible focusing range is changed in accordance with the panning operation of the zoom lens apparatus 130 (the change of the orientation of the zoom lens apparatus 130).

Figure 10A:
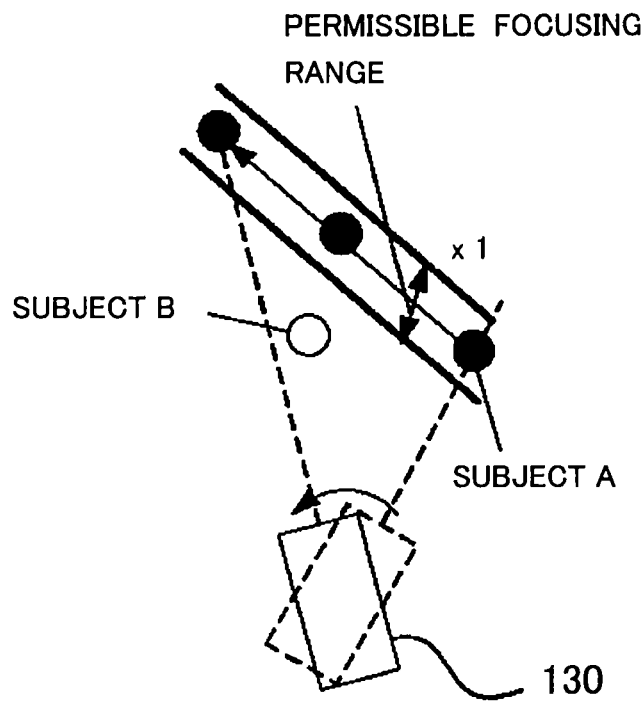
FIG. 10A shows a permissible focusing range during a panning operation in Embodiment 3.
Figure 10B:
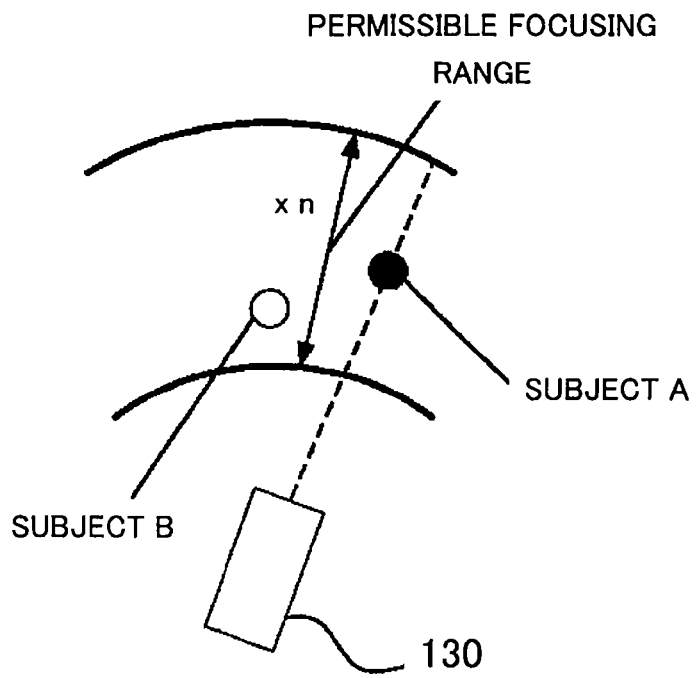
FIG. 10B shows a permissible focusing range when the panning operation is not performed in Embodiment 3.

FIGS. 10A and 10B show the zoom lens apparatus 130 of Embodiment 3, the subject A (focusing target) for which the operator intends to perform focusing and the subject B that is not the focusing target when seen from above.

As shown in FIG. 10A, the panning operation is generally performed to follow the moving subject A as the focusing target and thus a different subject is less frequently captured. However, the subject B that is not the focusing target frequently enters the image-pickup range during the panning operation. Thus, the panning operation is desirably performed with a narrow permissible focusing range.

In Embodiment 3, since the permissible focusing range is set to be narrow (f4($\omega$)=1) during the panning operation, the permissible focusing range can be set close to the subject A as the focusing target. This suppresses the focusing operation from being performed for the subject B entering the image-pickup range which is not the focusing target.

On the other hand, when the panning operation is not performed as shown in FIG. 10B, the permissible focusing range is set to be wide (n times). This enables the focusing operation for arbitrary subjects located in the wide permissible focusing range, based on the intention of the operator.

In Embodiment 3, the shake detecting sensor included in the zoom lens apparatus 130 was used in order to detect the panning operation. However, the panning operation may be detected by image processing performed by the camera 40 or an encoder attached to a tripod (not shown).

Embodiment 4

Figure 11:
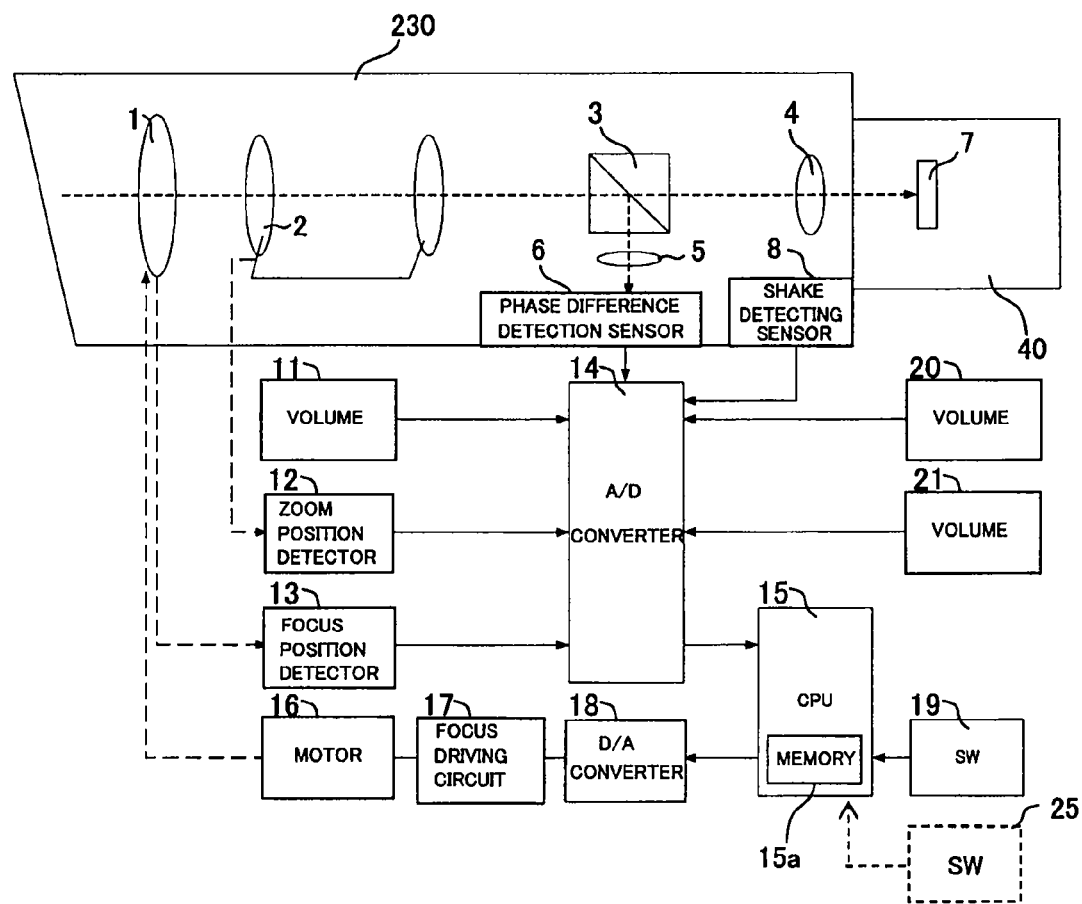
FIG. 11 is a block diagram showing the configuration of a zoom lens apparatus that is Embodiment 4 of the present invention.

FIG. 11 shows the configuration of a zoom lens apparatus 230 that is Embodiment 4 of the present invention. In FIG. 11, the same components as those shown in FIGS. 1 and 7 are denoted with the same reference numerals.

Reference numerals 20 and 21 denote operating members for determining the width of the permissible focusing range as an absolute range. Signals from these operating members 20 and 21 are input to the CPU 15 via the A/D converter 14.

Next, with reference to the flowchart of FIG. 12, focus control processing performed by the CPU 15 will be described.

When the power to the zoom lens apparatus 230 is turned on, the process proceeds to STEP 401 where the CPU 15 initializes the register, the memory 15a and the like in the CPU 15.

In STEP 402, the CPU 15 obtains the current focus position F detected by the focus position detector 13. In STEP 403, the CPU 15 initializes the target focus position Fx that is the target position to which the focus lens 1 is moved and stored in the memory 15a to the current focus position F.

Next, in STEP 404, the CPU 15 resets (or restarts) a timer 1. The timer 1 is used to count time after the stoppage of the panning operation.

Then, in STEP 405, the CPU 15 initializes a panning flag, showing whether or not the panning operation was performed, to OFF.

In STEP 406 to STEP 411, the CPU 15 performs the same processing as STEP 104 to STEP 109 of Embodiment 1.

When the CPU 15 in STEP 411 determines that the limitation on the movement of the focus lens 1 by the permissible focusing range is invalid based on the signal from the switch 19, the process jumps to STEP 427. When the CPU 15 in STEP 411 determines that the limitation on the movement of the focus lens 1 by the permissible focusing range is valid, the process proceeds to STEP 412 where the CPU 15 obtains the angular velocity ωp in the panning direction and the angular velocity ωt in the tilting direction, which are detected by the shake detecting sensor 8.

Next, in STEP 413, the CPU 15 calculates the lens angular velocity ω from those angular velocities ωp and ωt by using the expression shown in Embodiment 3.

Next, in STEP 414, the CPU 15 determines whether or not the lens angular velocity ω is equal to or lower than a threshold value. This threshold value is used to determine whether or not the panning operation is performed, which is stored as a fixed value in the CPU 15.

When the lens angular velocity ω is higher than the threshold value (i.e., when the panning operation of the zoom lens apparatus 230 is performed), the process proceeds to STEP 419 where the CPU 15 sets the panning flag to ON, and then the process jumps to STEP 420. When the lens angular velocity ω is equal to or lower than the threshold value (i.e., when the panning operation is not performed), the process proceeds to STEP 415.

In STEP 415, the CPU 15 determines whether or not the panning flag is OFF. When the panning flag is ON, the process proceeds to STEP 417 and STEP 418 where the CPU 15 sets the panning flag to OFF and resets (or restarts) the timer 1. Then, the process jumps to STEP 420. When the panning flag is OFF, the CPU 15 in STEP 416 determines whether or not the timer 1 shows a value equal to or higher than the threshold value. When the value of the timer 1 is equal to or higher than the threshold value, the process proceeds to STEP 420. When the value of the timer 1 is lower than the threshold value, the process proceeds to STEP 424.

The above processing in STEP 414 to STEP 419 is performed for determining whether or not it is immediately after the stoppage of the panning operation. The threshold value used in STEP 416 corresponds to a time as a reference for determining whether or not it is immediately after the stoppage of the panning operation. In this embodiment, this threshold value is a fixed value of about one second. However, the threshold value may be arbitrarily set by the operator through an operating member such as a volume dial.

When the timer 1 in STEP 416 shows a value equal to or higher than the threshold value (i.e., when it is not immediately after the stoppage of the panning operation), the process proceeds to STEPS 420 to 422. In STEPS 420 to 422, the CPU 15 firstly obtains, as in STEPS 110 to 112 in Embodiment 1, the operation amount A1 of the operating member 11. Then, the CPU 15 sets, on the basis of the operation amount A1, the permissible focusing range to a relative permissible focusing range from (Fx+ΔFmin) to (Fx+ΔFmax) based on the current target focus position Fx.

Next, in STEP 423, the CPU 15 determines whether or not the detected in-focus position (F+ΔF) is within the relative permissible focusing range, and then determines, depending on this determination result, whether or not to update the target focus position Fx.

When the detected in-focus position (F+ΔF) is within the relative permissible focusing range, the CPU 15 in STEP 427 sets the target focus position Fx to (F+ΔF). When the detected in-focus position (F+ΔF) is out of the relative permissible focusing range, the process jumps to STEP 428 where the CPU 15 does not update the target focus position Fx.

In STEP 428, the CPU 15 generates a control signal for driving the focus lens 1 to the target focus position Fx. In STEP 429, the CPU 15 outputs the control signal to the D/A converter. Then, the process returns to STEP 406 again.

In STEP 423 in and after the second routine, the CPU 15 redefines (or updates) the permissible focusing range from (Fx+ΔFmin) to (Fx+ΔFmax) by using the target focus position Fx updated or maintained in STEP 427 in the previous routine. Thus, the permissible focusing range is changed in accordance with (or to follow) the change in the target focus position Fx. In particular, in this embodiment, the permissible focusing range is changed in accordance with the panning operation of the zoom lens apparatus 230 (the change of the orientation of the zoom lens apparatus 130).

When the value of the timer 1 is smaller than the threshold value in STEP 416, which means that it is immediately after the stoppage of the panning operation, the process proceeds to STEP 424 where the CPU 15 obtains the operation amounts A2 and A3 of the volume dial 20 and the volume dial 21. In STEP 425, the CPU 15 calculates Fmax and Fmin as absolute focus positions not depending on the target focus position Fx by using the following expressions:

$$F\text{max} = k4 \times A2$$

$$F\text{min} = k4 \times A3$$

In the above expressions, k4 represents a coefficient for converting the operation amounts A2 and A3 to focus positions, the coefficient being stored in the CPU 15.

In STEP 426, the CPU 15 determines whether or not the detected in-focus position (F+ΔF) is within the range (absolute permissible focusing range) from Fmin to Fmax including the absolute focus position at its ends. When the detected in-focus position (F+ΔF) is within the absolute permissible focusing range, the process proceeds to STEP 427 where the CPU 15 sets the target focus position Fx to (F+ΔF). When the detected in-focus position (F+ΔF) is out of the absolute permissible focusing range, the process proceeds to STEP 428 where the CPU 15 does not update the target focus position Fx.

In STEP 428, the CPU 15 generates a control signal for driving the focus lens 1 to the target focus position Fx. In STEP 429, the CPU 15 outputs the control signal to the D/A converter. Then, the process returns to STEP 406.

In this manner, when it is immediately after the stoppage of the panning operation, the focusing operation can be performed for a subject located in the absolute permissible focusing range arbitrarily set by the operator (which is generally set to be wider than the relative permissible focusing range).

In Embodiment 4, when it is immediately after the stoppage of the change in the orientation of the zoom lens apparatus 230 by the panning operation, the permissible focusing range is set as the absolute permissible focusing range. On the other hand, during the panning operation in which the orientation of the zoom lens apparatus 230 is continuously being changed, the permissible focusing range is set to the relative permissible focusing range.

Figure 13A:
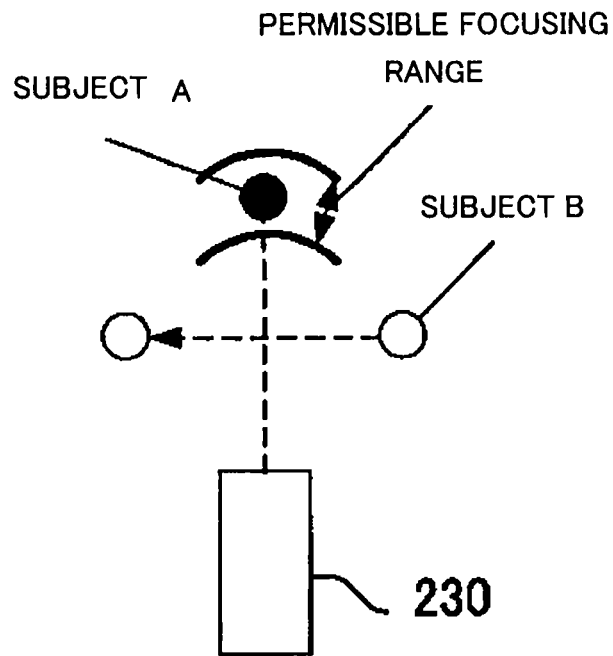
FIG. 13A shows a permissible focusing range when a panning operation is not performed in Embodiment 4.
Figure 13B:
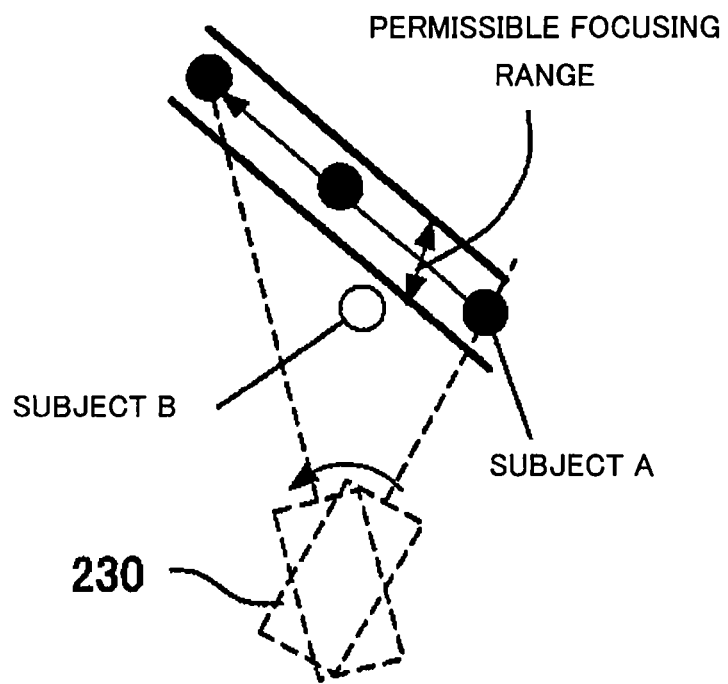
FIG. 13B shows a permissible focusing range during the panning operation in Embodiment 4.
Figure 13C:
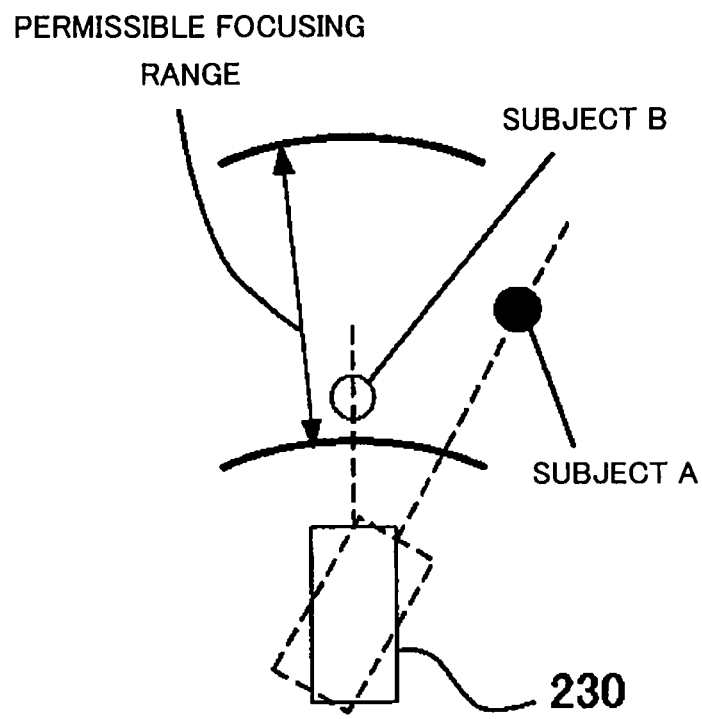
FIG. 13C shows a permissible focusing range immediately after the panning operation in Embodiment 4 stops.

FIGS. 13A to 13C show the permissible focusing ranges when the panning operation is not performed, when the panning operation is being performed, and when it is immediately after the stoppage of the panning operation. As already described, the permissible focusing range is automatically switched to the relative permissible focusing range or the absolute permissible focusing range depending on whether the panning operation is being performed or it is immediately after the stoppage of the panning operation.

When the panning operation of the zoom lens apparatus 230 is not being performed, the relative permissible focusing range is set as shown in FIG. 13A. Thus, even when the subject B that is not the focusing target passes in front of the currently in-focus subject A, the focusing operation for the subject B is prevented from being performed.

When the panning operation of the zoom lens apparatus 230 is being performed, the relative permissible focusing range is also set as shown in FIG. 13B. Thus, even when the subject B that is not the focusing target enters the image-pickup range while the zoom lens apparatus 230 follows the currently in-focus subject A to capture the image thereof, the focusing operation for the subject B is prevented from being performed.

On the other hand, when it is immediately after the stoppage of the panning operation, the absolute permissible focusing range is set as shown in FIG. 13C. In this case, the focusing operation for subjects in a wider range can be performed regardless of the current focus position. Generally, when an operator desires to change the subject as the focusing target (e.g., when the operator desires to change the subject A to the subject B), an operation having a specific pattern in which a panning operation is performed and then it is stopped (a specific change of the orientation of the zoom lens apparatus 230) is performed.

Thus, the change of the permissible focusing range from the relative permissible focusing range to the absolute permissible focusing range wider than the relative permissible focusing range in response to the stoppage of the panning operation enables a smooth change of the focusing-target subject.

Alternatively, a switch (third operating member) 25 may be provided as shown by the dotted line in FIG. 11. This switch is operated by the operator to select the relative permissible focusing range or the absolute permissible focusing range as the permissible focusing range.

Figure 12:
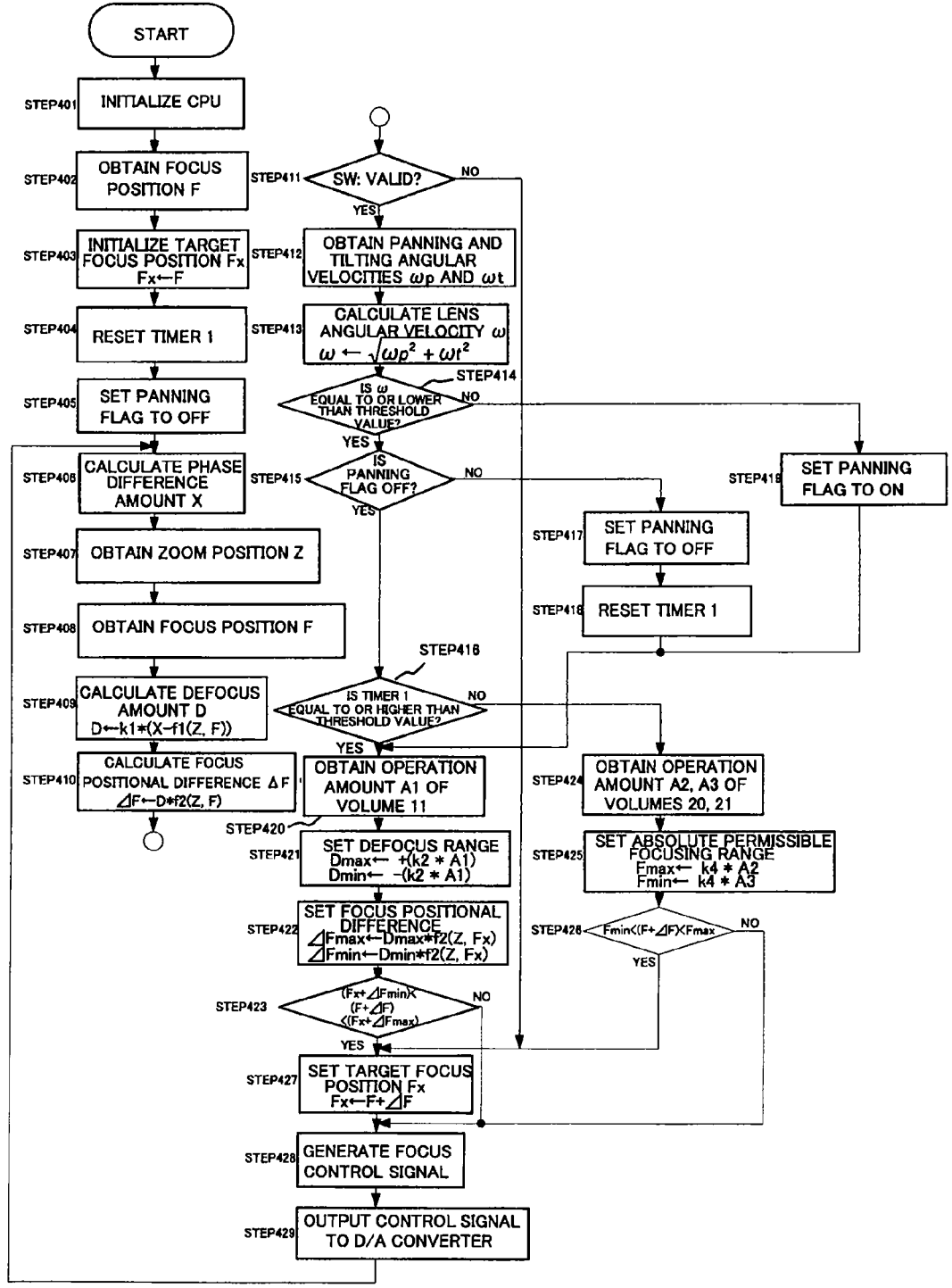
FIG. 12 is a flowchart showing a focus control processing in Embodiment 4.

In this case, the flowchart of FIG. 12 has between STEP 411 and STEP 412 a step of determining, based on the state of the switch 25, whether the relative permissible focusing range is selected or the absolute permissible focusing range is selected. When the relative permissible focusing range is selected, the process proceeds to STEP 412. When the absolute permissible focusing range is selected, the process proceeds to STEP 424.

As a result, the permissible focusing range arbitrarily selected from among the relative permissible focusing range and the absolute permissible focusing range by the operator can be used for the limitation on the movement of the focus lens 1.

As described above, according to the respective embodiments, the permissible movable range of the focus lens is redefined based on the target position thereof corresponding to the focusing-target subject or the position of the focus lens detected after its movement toward the target position. Thus, even when the subject moves, the permissible movable range of the focus lens can be set to be narrow. Therefore, whether the subject is the focusing target or not can be determined prior to the focusing operation. This can suppress the focus operation for an object that is not the focusing target and that exists at a nearer or farther position than the focusing-target subject.

Furthermore, the permissible movable range is changed in accordance with the target position or the change in the detected position of the focus lens. Thus, even when an object that is not the focusing target enters the image-pickup range, the focusing operation for the moving focusing-target subject can be continuously performed.

Furthermore, the present invention is not limited to these preferred embodiments and various variations and modifications may be made without departing from the scope of the present invention.

Although the respective above embodiments described the zoom lens apparatus mountable to the camera, other embodiments of the present invention includes a lens-integrated image-pickup apparatus (optical apparatus).

This application claims foreign priority benefits based on Japanese Patent Application No. 2006-353075, filed on Dec. 27, 2006, which is hereby incorporated by reference herein in its entirety as if fully set forth herein.

What is claimed is:
1. An optical apparatus, comprising:
a moveable focus lens;
a calculator that calculates the position of the focus lens for focusing on a subject;
a setter that sets a permissible movable range of the focus lens in an optical axis direction around a target position, wherein the permissible movable range of the focus lens is part of whole movable range of the focus lens; and
a controller that controls movement of the focus lens,
wherein the setter redefines the permissible movable range based on position information showing the target position,
wherein the controller is arranged to set the position of the focus lens calculated by the calculator as the target position to which the focus lens is moved when the calculator determines that the position of the focus lens calculated by the calculator is within the permissible movable range, and
wherein the controller is arranged to not set the position of the focus lens calculated by the calculator as the target position to which the focus lens is moved when the calculator determines that the position of the focus lens calculated by the calculator is out of the permissible movable range.

2. An optical apparatus according to claim 1, wherein the optical apparatus includes an operating member that is operated by an operator, and wherein the setter is configured to change the width of the permissible movable range in accordance with the operation of the operating member.

3. An optical apparatus according to claim 1, wherein the setter detects a moving speed of the subject in an optical axis direction of the optical apparatus, and changes the permissible movable range depending on the moving speed.

4. An optical apparatus according to claim 1, wherein the setter detects a change in orientation of the optical apparatus, and changes the width of the permissible movable range depending on the change in the orientation.

5. An optical apparatus according to claim 4, wherein the controller determines whether the change in the orientation of the optical apparatus is being continued or has stopped, and switches, depending on the determination result, whether to use a range set by the setter or a fixed range specified by a distance from the optical apparatus as the permissible movable range.

6. The optical apparatus according to claim 1, wherein the optical apparatus includes an operating member that is operated by an operator, and wherein the controller switches, depending on the state of the operating member, whether to use a range set by the setter or a fixed range specified by a distance from the optical apparatus as the permissible movable range.

7. An optical apparatus, comprising:
a moveable focus lens,
a calculator that calculates the position of a focus lens for focusing on a subject;
a setter that sets a permissible movable range of the focus lens in an optical axis direction around a target position, wherein the permissible movable range of the focus lens is part of whole movable range of the focus lens; and
a controller that controls movement of the focus lens,
wherein the setter moves the permissible movable range to follow the change of the target position,
wherein the controller is arranged to set the position of the focus lens calculated by the calculator as the target position to which the focus lens is moved when the calculator determines that the position of the focus lens calculated by the calculator is within the permissible movable range, and
wherein the controller is arranged to not set the position of the focus lens calculated by the calculator as the target position to which the focus lens is moved when the calculator determines that the position of the focus lens calculated by the calculator is out of the permissible movable range.

8. An optical apparatus, comprising:
a moveable focus lens,
a calculator that calculates the position of a focus lens for focusing on a subject;
a setter that sets a permissible movable range of the focus lens in an optical axis direction around the position of the focus lens, wherein the permissible movable range of the focus lens is part of whole movable range of the focus lens;
a controller that controls movement of the focus lens,
a detector that detects the position of the focus lens,
wherein the setter moves the permissible movable range to follow the change of the position of the focus lens detected by the detector,
wherein the controller is arranged to set the position of the focus lens calculated by the calculator as the target position to which the focus lens is moved when the calculator determines that the position of the focus lens calculated by the calculator is within the permissible movable range, and
wherein the controller is arranged to not set the position of the focus lens calculated by the calculator as the target position to which the focus lens is moved when the calculator determines that the position of the focus lens calculated by the calculator is out of the permissible movable range.

9. An optical apparatus according to claim 8, wherein the optical apparatus includes a focus detector that performs focus detection by a phase difference detection method, and wherein the calculator calculates the position of the focus lens for focusing on the subject based on the detection result from the focus detector.

10. An optical apparatus according to claim 8, wherein the optical apparatus includes a first operating member that is operated by an operator, and wherein the controller switches to limit the movement of the focus lens within the permissible movable range or not to limit the movement of the focus lens depending on the state of the first operating member.

11. An optical apparatus, comprising:
a moveable focus lens;
a calculator that calculates the position of the focus lens for focusing on a subject;
a setter that sets a permissible movable range of the focus lens in an optical axis direction around the position of the focus lens, wherein the permissible movable range of the focus lens is part of whole movable range of the focus lens; and
a controller that controls movement of the focus lens,
a detector that detects the position of the focus lens,
wherein the setter redefines the permissible movable range based on position information showing the position of the focus lens detected by the detector,
wherein the controller is arranged to set the position of the focus lens calculated by the calculator as the target position to which the focus lens is moved when the calculator determines that the position of the focus lens calculated by the calculator is within the permissible movable range, and
wherein the controller is arranged to not set the position of the focus lens calculated by the calculator as the target position to which the focus lens is moved when the calculator determines that the position of the focus lens calculated by the calculator is out of the permissible movable range.

12. An optical apparatus according to claim 11, wherein the setter sets the permissible movable range depending on a change in the position information.

13. An image-pickup system comprising:
an optical apparatus according to claim 1, and
an image-pickup apparatus mountable to the optical apparatus.

14. An image-pickup system comprising:
an optical apparatus according to claim 7, and
an image-pickup apparatus mountable to the optical apparatus.

15. An image-pickup system comprising:
an optical apparatus according to claim 8, and
an image-pickup apparatus mountable to the optical apparatus.

16. An image-pickup system comprising:
an optical apparatus according to claim 11, and
an image-pickup apparatus mountable to the optical apparatus.

* * * * *